(12) United States Patent
Carnevali

(10) Patent No.: US 10,330,251 B2
(45) Date of Patent: Jun. 25, 2019

(54) FINGER GRIP MOUNTING APPARATUS

(71) Applicant: Jeffrey D. Carnevali, Seattle, WA (US)

(72) Inventor: Jeffrey D. Carnevali, Seattle, WA (US)

(*) Notice: Subject to any disclaimer, the term of this patent is extended or adjusted under 35 U.S.C. 154(b) by 385 days.

(21) Appl. No.: 15/361,047

(22) Filed: Nov. 24, 2016

(65) Prior Publication Data

US 2018/0146562 A1    May 24, 2018

(51) Int. Cl.
| B60R 11/02 | (2006.01) |
| F16M 13/02 | (2006.01) |
| F16B 2/10 | (2006.01) |
| F16B 5/06 | (2006.01) |

(52) U.S. Cl.
CPC ............. *F16M 13/02* (2013.01); *F16B 2/10* (2013.01); *F16B 5/0642* (2013.01)

(58) Field of Classification Search
USPC ........ 248/313, 316.1, 288.31, 230.1, 231.61, 248/230.5, 316.8, 316.5
See application file for complete search history.

(56) References Cited

U.S. PATENT DOCUMENTS

| 2,319,377 A | 10/1942 | Wallace et al. |
| 2,733,492 A | 8/1951 | Copell |
| 3,509,882 A | 5/1970 | Blake |
| 4,066,231 A | 1/1978 | Bahnew et al. |
| 4,118,003 A | 10/1978 | Dillow |
| 4,798,294 A | 1/1989 | Bodi |
| 4,957,264 A | 9/1990 | Hakanen |
| 4,976,721 A | 12/1990 | Blasnik et al. |
| 5,024,408 A | 6/1991 | Magee |
| 5,149,032 A | 9/1992 | Jones et al. |
| 5,457,745 A | 10/1995 | Wang |
| 5,582,377 A | 12/1996 | Quesada |
| D377,798 S | 2/1997 | Heine |
| 5,653,414 A | 8/1997 | Chimel |
| 5,673,628 A | 10/1997 | Boos |
| D390,849 S | 2/1998 | Richter et al. |
| 5,788,202 A | 8/1998 | Richter |
| 5,791,609 A * | 8/1998 | Hankins ................. F16M 13/02 248/124.1 |
| 5,793,614 A | 8/1998 | Tollbom |
| 5,903,645 A | 5/1999 | Tsay |
| 5,917,907 A | 6/1999 | Kela |
| 6,032,337 A | 3/2000 | Rankin, Jr. et al. |

(Continued)

*Primary Examiner* — Bradley Duckworth
(74) *Attorney, Agent, or Firm* — Charles J. Rupnick

(57) ABSTRACT

A flexible portable device holding and cradling apparatus that overcomes limitations of the prior art by providing a flexible portable device mounting apparatus provided by a frame that is structured for being coupled to an external mounting device, the frame having a mounting surface and a plurality of first and second passages provided adjacent to each of opposing side edges thereof; a plurality of substantially resiliently flexible clamps each having a leg portion, a finger portion extended from the leg portion, and a substantially resiliently flexible urging portion coupled between the leg portion and the finger portion; and coupling means operating between different ones of the first and second passages of the frame and the leg portion of each of different ones of the clamps for coupling the leg portion relative to the mounting surface.

36 Claims, 6 Drawing Sheets

(56) References Cited

U.S. PATENT DOCUMENTS

| | | |
|---|---|---|
| 6,095,470 A | 8/2000 | Kalis |
| 6,173,933 B1 | 1/2001 | Whiteside et al. |
| 6,213,438 B1 | 4/2001 | Ostby et al. |
| 6,229,893 B1 | 5/2001 | Chen |
| 6,370,741 B1 | 4/2002 | Lu |
| 6,427,959 B1 | 8/2002 | Kalis et al. |
| 6,600,827 B2 | 7/2003 | Lu |
| 6,647,248 B1 | 11/2003 | Ortscheid et al. |
| 6,785,567 B2 | 8/2004 | Kato |
| 6,802,848 B2 | 10/2004 | Anderson et al. |
| 6,814,377 B2 | 11/2004 | Silverman et al. |
| 6,817,587 B2 | 11/2004 | Lin |
| 7,017,243 B2 | 3/2006 | Carnevali |
| 7,032,872 B2 | 4/2006 | Sullivan |
| 7,551,458 B2 | 6/2009 | Carnevali |
| 9,568,148 B2 * | 2/2017 | Carnevali ............ B60R 11/0241 |
| 9,992,885 B1 * | 6/2018 | Smith .................... F16M 11/04 |
| 10,189,525 B2 * | 1/2019 | Allen ....................... B62J 9/003 |
| 2004/0022388 A1 | 2/2004 | Chan et al. |
| 2006/0233601 A1 * | 10/2006 | Crain ......................... E06C 7/14 403/300 |
| 2007/0022583 A1 | 2/2007 | Carnevali |
| 2007/0034753 A1 * | 2/2007 | Lee ..................... B60R 11/0241 248/121 |

* cited by examiner

FINGER GRIP MOUNTING APPARATUS

This application claims priority benefit of copending parent U.S. patent application Ser. No. 11/711,418 filed in the name of Jeffrey D. Carnevali the sole inventor of the present invention on February 26, 2007, the complete disclosure of which is incorporated herein by reference.

FIELD OF SEARCH

The present invention relates to a mounting apparatus for an electronic device, and in particular to mounting apparatuses for securely releasably cradling a pocket-sized cellular telephone, personal computer and other mobile electronic devices.

BACKGROUND OF THE DEVICE

Device holding apparatus are generally well-known and commonly used to mount and securely cradle hand-held pocket-sized personal computers, commonly referred to as "pocket PCs," and other mobile electronic devices, such as cellular telephones, mobile global positioning system (GPS) receivers, Personal Digital Accessories (PDAs) and other mobile electronic devices of this type.

One example of such mounting platforms is presented in U.S. Pat. No. 6,427,959, entitled MOUNTING BRACKET FOR AN ELECTRONIC DEVICE, issued Aug. 6, 2002, to Kalis, et al., which is incorporated herein by reference, which includes a cradle adapted for being releasably secured to the electronic device and also includes a support adapted for being mounted to a surface. The cradle is adapted to move along its longitudinal axis relative to an electrical connector that is slidably connected to the cradle. A user can fix the position of the cradle relative to the mounting surface by means of a pin and locking mechanism on the back of the cradle to the support.

Other mounting platforms are also currently known. However, current mounting platforms are inefficient for effectively securely releasably cradling a pocket-sized cellular telephone, personal computers or other mobile electronic device.

SUMMARY OF THE DESCRIPTION

The present device holding and cradling apparatus overcomes limitations of the prior art by providing a flexible portable device mounting apparatus provided by a frame that is structured for being coupled to an external mounting device, the frame having a mounting surface and a plurality of first and second passages provided adjacent to each of opposing side edges thereof; a plurality of substantially resiliently flexible clamps each having a leg portion, a finger portion extended from the leg portion, and a substantially resiliently flexible urging portion coupled between the leg portion and the finger portion; and coupling means operating between different ones of the first and second passages of the frame and the leg portion of each of different ones of the clamps for coupling the leg portion relative to the mounting surface.

According to one aspect of the mount apparatus, one or more of the first and second passages further includes a slot formed through the frame substantially crosswise of the mounting surface.

According to another aspect of the mount apparatus, one or more of the first and second passages further includes a keyway recessed into the mounting surface around the slot and sized to slidingly receive therein the leg portion of one of the clamps.

According to another aspect of the mount apparatus, the finger portion of one or more of the clamps further includes an operational clamping surface inclined toward the respective leg portion thereof.

According to another aspect of the mount apparatus, the urging portion of one or more of the clamps further includes a substantially resiliently flexible curved elbow portion positioned outwardly of a space between the inclined operational clamping surface and the respective leg portion thereof.

According to another aspect of the mount apparatus, the mount apparatus further includes third and fourth passages provided adjacent to each of opposing end edges of the frame.

According to another aspect of the mount apparatus, the mount apparatus further includes end caps each having a leg portion and a foot portion oriented substantially upright of the leg portion; and coupling means operating between one of the third and fourth passages of the frame and the leg portion of one of the end caps for movably coupling the leg portion thereof relative to the respective opposing end edge of the frame. According to another aspect of the mount apparatus, one or more of the third and fourth passages further includes a slot formed through the frame substantially lengthwise of the mounting surface, and a keyway recessed into the mounting surface around the slot and sized to slidingly receive therein the leg portion of one of the end caps.

Other aspects and objects, features, and advantages of the suction cup holding device will be apparent in the written description which follows.

BRIEF DESCRIPTION OF THE DRAWINGS

The foregoing aspects and many of the attendant advantages of this suction cup holding device will become more readily appreciated as the same becomes better understood by reference to the following detailed description, when taken in conjunction with the accompanying drawings, wherein:

FIGS. 6 and 7 illustrate the novel mounting apparatus holding portable devices of different sizes, wherein FIG. 6 illustrates the mounting apparatus having resilient clamps spread wide for holding a large sized portable device, and FIG. 7 illustrates the mounting apparatus having resilient clamps moved close for holding a small sized portable device;

FIG. 8 illustrates the novel mounting apparatus having an alternative pair of resilient clamps that are movable in keyways for adjusting the distance there between;

FIGS. 10 and 11 illustrate the novel mounting apparatus having an alternative frame in which the optional keyways are eliminated, wherein FIG. 10 illustrates the mounting apparatus having resilient clamps spread wide for holding a large sized portable device, and FIG. 11 illustrates the mounting apparatus having resilient clamps moved close for holding a small sized portable device.

DETAILED DESCRIPTION OF PREFERRED EMBODIMENT

In the Figures, like numerals indicate like elements.

The terms "up" and "down" and derivatives are used solely for clarity in describing the suction cup holding device and relate to the relative orientation of the individual components shown in the Figures and the assembly relative to a surface to which it is attached.

Figure 1:
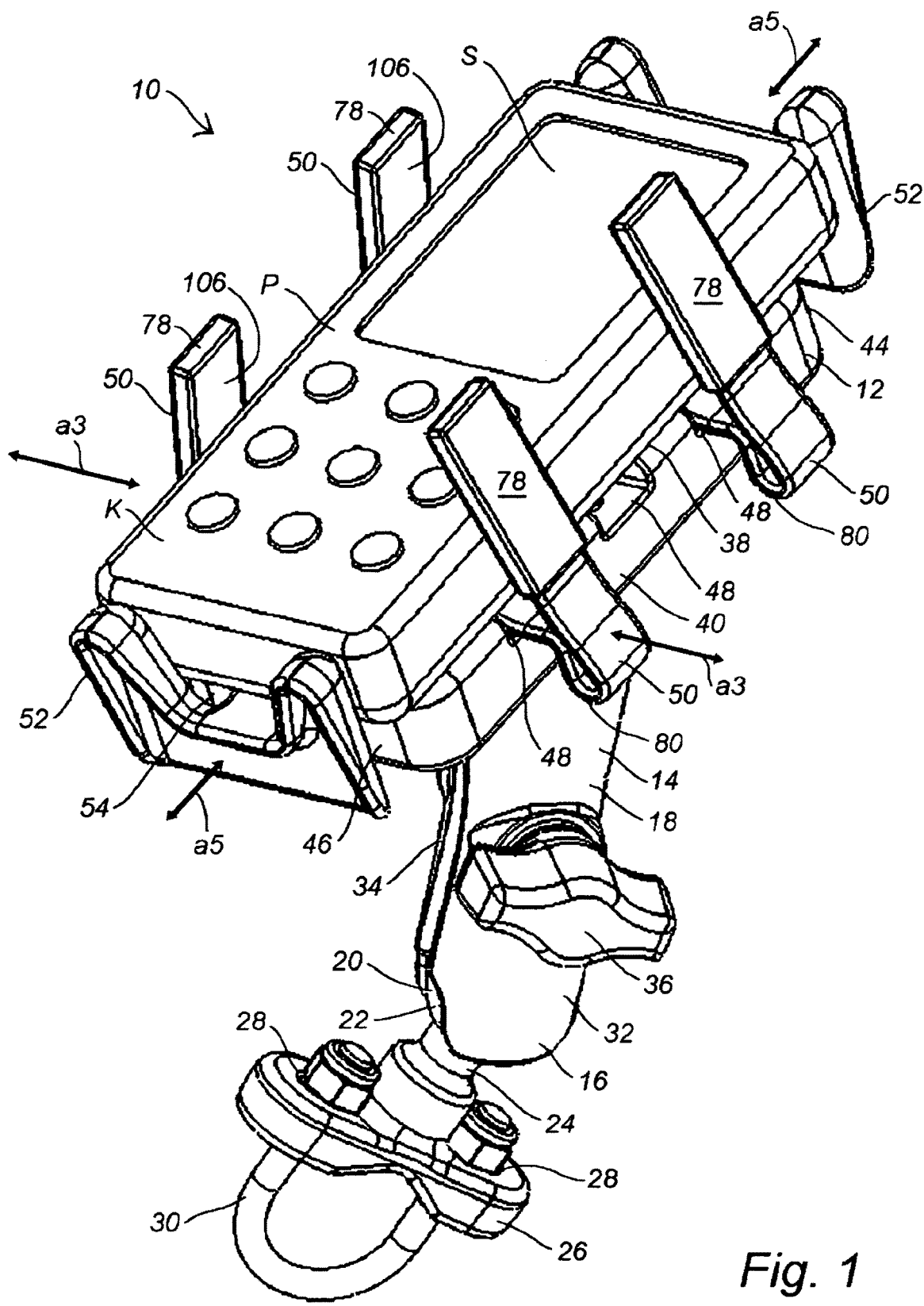
FIG. 1 illustrates the device of the present invention embodied by example and without limitation as a novel flexible and optionally resizable portable device mounting apparatus.

FIG. 1 illustrates the device of the present invention embodied by example and without limitation as a novel flexible and optionally resizable portable device mounting apparatus 10. The apparatus 10 includes a substantially rigid frame 12 adapted for being coupled to an external mounting surface, either directly or through an external mounting device 14. Here, by example and without limitation, the external mounting device 14 is an interlockable ball-and-socket joint mechanism 16 of the type disclosed by Jeffrey D. Carnevali, the inventor of the present mounting apparatus 10, in U.S. Pat. No. 5,845,885, entitled "Universally Positionable Mounting Device," issued Dec. 8, 1998, the complete disclosure of which is incorporated herein by reference. Alternatively, the interlockable ball-and-socket joint mechanism 16 is disclosed here by example and without limitation as the interlockable ball-and-socket joint mechanism disclosed in U.S. Pat. No. 6,561,476, entitled "Positively-Positionable Mounting Apparatus," issued to Jeffrey D. Carnevali, the inventor of the present mounting apparatus 10, on May 13, 2003, the complete disclosure of which is incorporated herein by reference. Accordingly, the interlockable ball-and-socket joint 16 is formed by example and without limitation of a split arm assembly 18 with a pair of ball-end mounts or "couplers" 20 each provided with a substantially smooth, part-spherical head 22 of a pressure deformable, resilient elastomeric material, which renders the part-spherical head 22 relatively resiliently radially compressible. Each resiliently deformable part-spherical head 22 is extended on a reduced diameter stem or "neck" 24 relatively upstanding on a mounting flange 26, which is illustrated here by example and without limitation as having a pair of off-set mounting holes 28 for a pipe clamp 30. The mounting flange 26 is optionally disc-shaped and formed with a quantity of the mounting holes 28 for mounting on the external mounting surface by mechanical fasteners such as screws or other fasteners. Alternatively, the mounting apparatus 10 is mounted using an adhesive bond such as a resilient adhesive pad, commonly known as a Pressure Sensitive Adhesive (PSA), applied between the mounting flange 26 and the external mounting surface. Other mounting devices, such as suction cups and clamps, are also contemplated and are considered equivalent structures and are substituted without departing from the scope and intent of the invention.

By example and without limitation, the split arm assembly 18 is formed of a pair of elongated, relatively rigid arm sections 32 and 34 and a clamping mechanism 36. The respective arm sections 32, 34 form pairs of operatively opposing sockets adjacent to opposite ends of the ball-and-socket joint mechanism 16, the operatively opposing sockets each having part-spherical surfaces at the inner peripheries thereof that cooperate with the part-spherical head 22 of the coupler 20 to rotate and pivot the mounting apparatus 10 in a desired rotational and pivotal orientation. The clamping mechanism 36 is then operated for squeezing together the pair of arm sections 32 and 34 about the resiliently deformable part-spherical head 22 of the coupler 20 for interlocking the mounting apparatus 10 in the desired rotational and pivotal orientation.

The frame 14 has a substantially planar mounting surface 38 for resting a portable device P such as a cellular phone (shown) in such manner as to avoid either visual or manual obstruction of a display screen S or keypad K. The frame 14 is, by example and without limitation, generally rectangular in shape having substantially parallel lengthwise opposite side edge surfaces 40 and 42 spaced apart by substantially parallel and spaced apart widthwise opposite end edge surfaces 44 and 46. However, other generally square, round or oblong shapes are also contemplated and are considered equivalent structures and are substituted therefore without departing from the scope and intent of the invention. By example and without limitation, a quantity of optional substantially parallel keyways 48 are oriented substantially crosswise of the frame 14 and recessed into the mounting surface 38. The keyways 48 are substantially evenly spaced lengthwise of the frame 14 and intersect opposite edge surfaces 40 and 42 of the mounting surface 38. One or more of the keyways 48 are structured to retain a resiliently flexible clamp 50 each structured to resiliently compress the cellular phone (shown) or other portable device P toward the mounting surface 38 of the frame 14. The resilient clamps 50 are optionally movable in the keyways 48, as indicated by arrows a3, for adjusting the spacing there between.

The mounting apparatus 10 may optionally include opposing movable end stops 52 for adjustably fixing a length of the frame 14 and positioning the cellular phone (shown) or other portable device P between the resilient clamps 50, as indicated by arrows a5. By example and without limitation, the frame 14 is formed with an optional pair of substantially parallel keyways 54 recessed into the mounting surface 38 oriented substantially lengthwise of the frame 14 and intersecting opposite end edge surfaces 44 and 46 of the mounting surface 38. When present, the lengthwise keyways 54 are structured to retain the movable end stops 52 for adjusting the position of the cellular phone (shown) or other portable device P relative to the resilient clamps 50.

Figure 2:
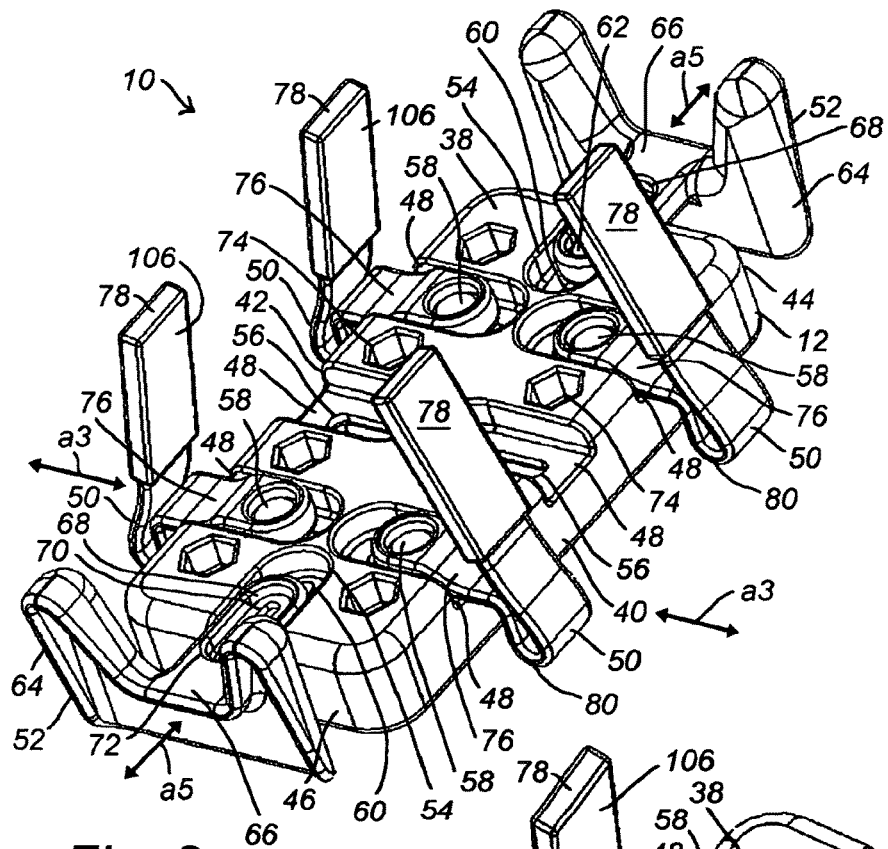
FIG. 2 is a perspective view of the novel mounting apparatus having the portable device removed for clarity and showing several optional substantially parallel keyways being recessed into a mounting surface of a frame portion of the apparatus.

FIG. 2 is a perspective view of the novel mounting apparatus 10 having the portable device P removed for clarity. Several of the optional substantially parallel keyways 48 are recessed into the mounting surface 38 of the frame 14. Here, three keyways 48 are substantially evenly spaced lengthwise of the frame 14 and intersect the opposite edge surfaces 40 and 42 of the mounting surface 38. Furthermore, when present the keyways 48 are optionally oriented substantially perpendicular to the edge surfaces 40 and 42 when the frame is generally square or rectangular in shape. More or fewer optional keyways 48 are also contemplated and are considered equivalent structures and are substituted therefore without departing from the scope and intent of the invention.

The resilient clamps 50 are optionally movable in the keyways 48, when present, for adjusting the distance there between. By example and without limitation, when present one or more of the keyways 48 is optionally formed with a slot 56 lengthwise thereof and extending through the frame 14. Otherwise, the slots 56 are instead formed through the mounting surface 38 of the frame 14. Each slot 56 is formed to accept a fastener 58 there through for fixing the respective resilient clamp 50 in position relative to the mounting surface 38 of the frame 14.

The end stops 52 are shown here by example and without limitation as being optionally movable in the keyways 54, when present, for adjusting the distance there between. By example and without limitation, when present one or more of the keyways 54 is optionally formed with a slot 60 lengthwise thereof and extending through the frame 14. Otherwise, the slots 27 are instead formed through the mounting surface 38 of the frame 14. Each slot 60 is formed to accept a fastener 62 (one removed for clarity) there through for fixing the respective movable end stops 52 in position relative to the mounting surface 38 of the frame 14 and, by extension, the resilient clamps 50. The opposing end stops 52 thus effectively increase or decrease the effective length of the frame 14.

By example and without limitation, each of the end stops 52 is formed with a substantially upright foot portion 64 with a leg portion 66 extended crosswise thereto. The leg portion 66 is sized to slide in the optional lengthwise keyways 54, when present, and recessed into the mounting surface 38 of the frame 14. Furthermore, the leg portion 66 of each end stop 52 is structured to be secured in the optional lengthwise keyways 54, when present, in a fixed position relative to the mounting surface 38 of the frame 14. For example, the leg portion 66 is formed there through with a passage 68 for passing the fastener 62 through into the slot 60. As illustrated here by example and without limitation, each passage 68 includes a clearance hole 70 sized to admit the fastener 62 there through, and a recess 72, such as a countersink or counter bore, sized to recess the fastener 62 into the end stop's leg portion 66.

Optionally, the clearance hole 70 is a slot (shown) formed lengthwise of the leg portion 66, and the recess 72 is a keyway such that the effective lengthwise range of motion of the end stop 52 is a combination of the lengths of the slot 60 through the frame 14 and the slot 70 through the leg portion 66 of the end stop 52.

The frame 14 is also formed with a plurality of mounting holes 74 for mounting the novel mounting apparatus 10 to an external surface.

Figure 3:
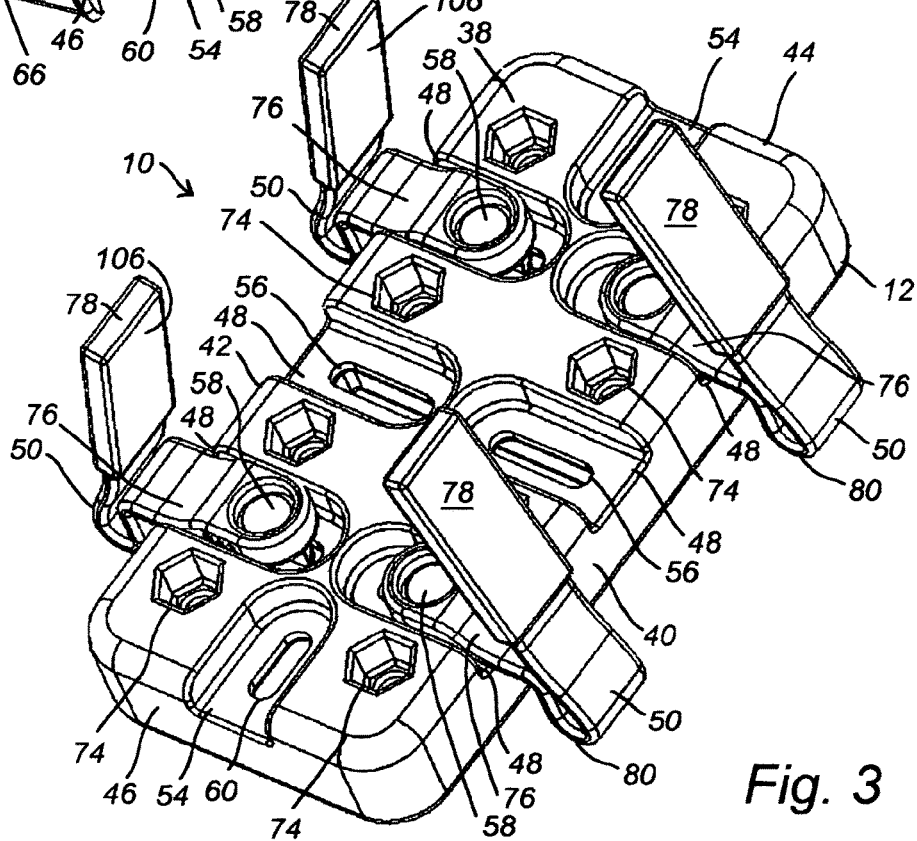
FIG. 3 illustrates the novel mounting apparatus having a pair of movable end stops removed for clarity.

FIG. 3 illustrates the novel mounting apparatus 10 having the movable end stops 52 removed for clarity.

Figure 4:
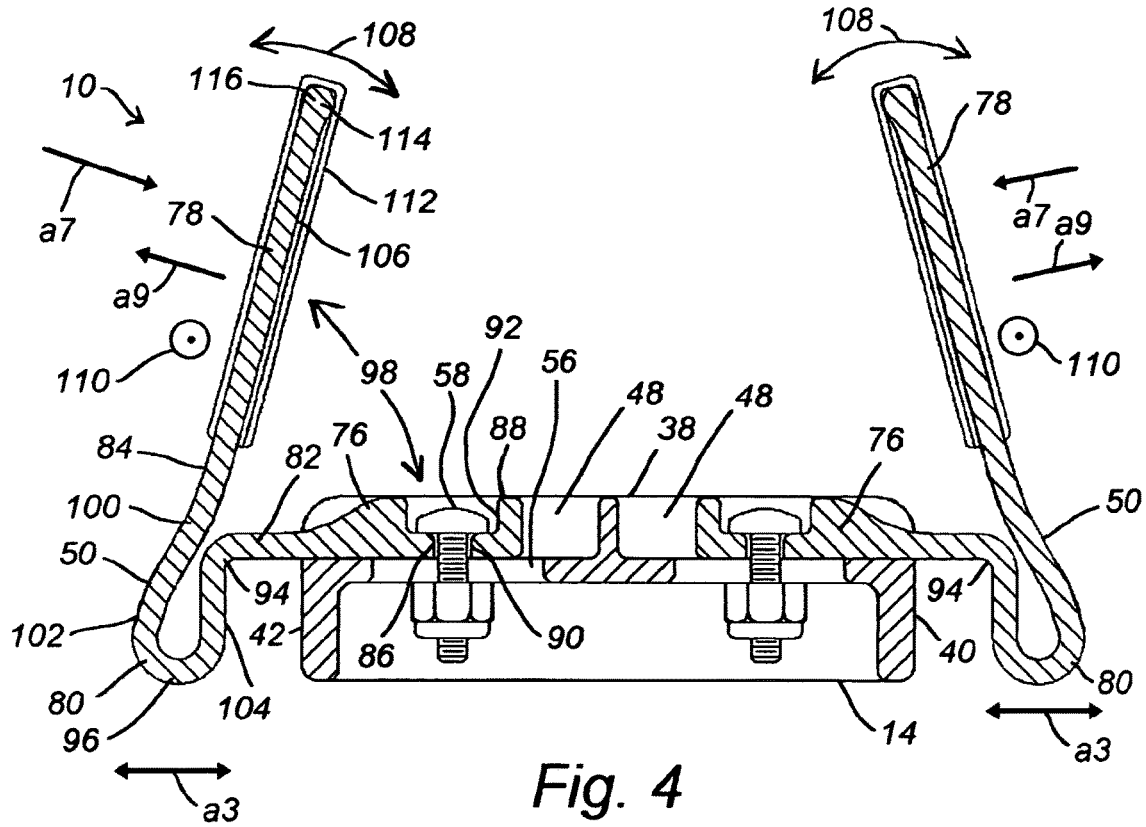
FIG. 4 is a cross-section view illustrating the novel mounting apparatus.

FIG. 4 illustrates the novel mounting apparatus 10 having the portable device P removed for clarity. Here, the optional keyways 48 are recessed into the mounting surface 38 of the frame 14 and intersect the opposite edge surfaces 40 and 42 of the mounting surface 38. The resilient clamps 50 are illustrated here as being movable in the keyways 48 for adjusting the distance there between. The optional slots 56, when present, are formed lengthwise of the keyway 48, when present, and extend through the frame 14. Otherwise, the slots 56 are instead formed through the mounting surface 38 of the frame 14, and the resilient clamps 50 are movable directly on the mounting surface 38. The slot 56 is formed to accept one of the fasteners 58 there through for fixing the respective resilient clamp 50 in position relative to the mounting surface 38 of the frame 14.

The resilient clamps 50 are illustrated here by example and without limitation as being substantially flexible finger clamps each being formed with a substantially rigid leg portion 76 and a substantially "spatulate" finger portion 78 extended therefrom and substantially aligned therewith in a open V-shape with the finger portion 78 slightly inclined from an upright orientation toward the leg portion 76. A resilient urging portion 80 is coupled between adjacent inner end portions 82 and 84 of the leg portion 76 and finger portion 78, respectively.

The leg portion 76 is sized to slide in the optional lengthwise keyways 48, when present, and recessed into the mounting surface 38 of the frame 14. Furthermore, the leg portion 76 of each resilient clamp 50 is structured to be secured in the optional lengthwise keyways 48, when present, in a fixed-position relative to the mounting surface 38 of the frame 14. For example, the leg portion 76 is formed there through with a passage 86 adjacent to an outer end 88 thereof for passing the fastener 58 through into the slot 56. As illustrated here by example and without limitation, each passage 86 includes a clearance hole 90 sized to admit the fastener 58 there through, and a recess 92, such as a countersink or counter bore (shown) sized to recess the fastener 58 into the clamp's leg portion 76.

Each resilient clamp 50 is further formed with the substantially "spatulate" finger portion 78 extended from the leg portion 76 and substantially aligned therewith. By example and without limitation, the resilient urging portion 80 is coupled between a curved knee portion 94 positioned adjacent to the inner end portion 82 of the leg portion 76 and the inner end portion 84 of the finger portion 78, whereby the resilient urging portion 80 urges the finger portion 78 generally toward the respective leg portion 76 as indicated by arrows a7.

Accordingly, when inserted between the opposing finger portions 78 of the resilient clamps 50 on opposite sides 40 and 42 of the frame 14, the cellular phone or other portable device P is resiliently urged toward the opposing finger portions 78 and against the mounting surface 38 by the respective resilient urging portions 80 of opposing clamps 50. After the spatulate finger portions 78 have been bent away from one another and from the frame's mounting surface 38 for inserting the device P there between, the respective resilient urging portions 80 cause the respective spatulate finger portions 78 to substantially automatically tend to resiliently return to its original configuration. This substantially automatic tendency of the respective finger portions 78 to each resiliently return to its original configuration effectively urges the device P simultaneously inwardly toward spatulate finger portions 78 of opposing resilient clamps 50 and downwardly toward the mounting surface 38 of the frame 14, as indicated by arrows a7.

As illustrated here by example and without limitation, the resilient urging portion 80 of the resilient clamp 50 is embodied as a substantially resiliently flexible curved elbow portion 96. For example, the leg portion 76 includes the curved knee portion 94 positioned adjacent to the second inner end 82 thereof and curved outwardly away from a smaller volume 98 enclosed by the V-shape formed between the leg portion 76 and finger portion 78. The finger portion 78 includes a curved wrist portion 100 positioned at its inner end 84 and extended outwardly away from the smaller volume 98 enclosed by the V-shape of the leg 76 and finger 78.

The substantially flexible curved elbow portion 96 of the resilient urging portion 80 is, for example, positioned outside the smaller volume 98 enclosed by the V-shape of the leg 76 and finger 78 and coupled between the outwardly curved knee portion 94 of the leg portion 76 and the outwardly curved wrist portion 100 of the finger portion 78.

Here, by example and without limitation, the resilient urging portion 80 of each resilient clamp 50 further includes relatively long arm sections 102 and 104 extended between the elbow portion 96 and the knee 94 and wrist 100 portions, respectively. As illustrated here by example and without limitation, the elbow portion 96 is formed with sufficient curvature to direct an inclined operational clamping surface 106 of the spatulate finger portion 78 facing the leg portion 76 are generally inclined toward the respective leg portion 76 as indicated by arrows a7. Accordingly, when the resilient clamps 50 are installed on the frame 14 with their respective leg portions 76 fitted into the different keyways 48, the clamping surface 106 of each respective spatulate finger portion 78 is directed generally toward the frame 14, as indicated by arrows a7, such that the clamping surfaces 106 are generally inclined toward the mounting surface 38.

The elbow portion 96 and the two relatively long arm sections 102 and 104 of the resilient urging portion 80 are substantially resiliently flexible or "springy" along a first direction 108 substantially aligned with the leg portion 76, while being substantially rigid or stiff along a second direction 110 substantially crosswise of the leg portion 76. The elbow portion 96 cooperates with the two relatively long arm sections 102 and 104 in a resilient bending motion, as indicated by arrow a9, substantially opposite the first arrow a7. Accordingly, opposing finger portions 78 of the resilient clamps 50 on opposite sides 40 and 42 of the frame 14 are resiliently bendable away from one another and from the frame's mounting surface 38 for inserting the cellular phone (shown) or other portable device P between the opposing finger portions 78 of the resilient clamps 50 and against the mounting surface 38. The resiliently bendable feature of the elbow portion 96 and the two relatively long arm sections 102 and 104 of the resilient urging portion 80 cause each of the spatulate finger portions 78, after being bent away from one another and from the frame's mounting surface 38, to substantially automatically tend to return to its original configuration with its operational clamping surface 106 generally inclined toward the frame 14 and the mounting surface 38, as indicated by arrows a7.

The operational clamping surfaces 106 are optionally equipped with a relatively high coefficient of friction that operates in combination with the pressure applied by the inclined clamping surfaces 106 of the clamp members 50 to limit slippage of the device P relative to the frame's mounting surface 38. Here, by example and without limitation, the relatively high coefficient of friction is provided by a sleeve 112 fitted over the spatulate finger portions 78 of one or more of the resilient clamps 50. For example, the sleeve 112 is optionally formed of a high surface friction material, such as a Vinyl or a low durometer polyvinylchloride (PVC) material or another suitable plastic material, which operates as a traction enhancing mechanism. By example and without limitation, the spatulate-finger portions 78 are optionally formed with a bulb 114 adjacent to an outer tip 116 thereof that is slightly over-sized relative to the sleeve 112. The bulb 114 thus spreads the sleeve 112, which operates to hold it in place on the finger portion 78.

Figure 5:
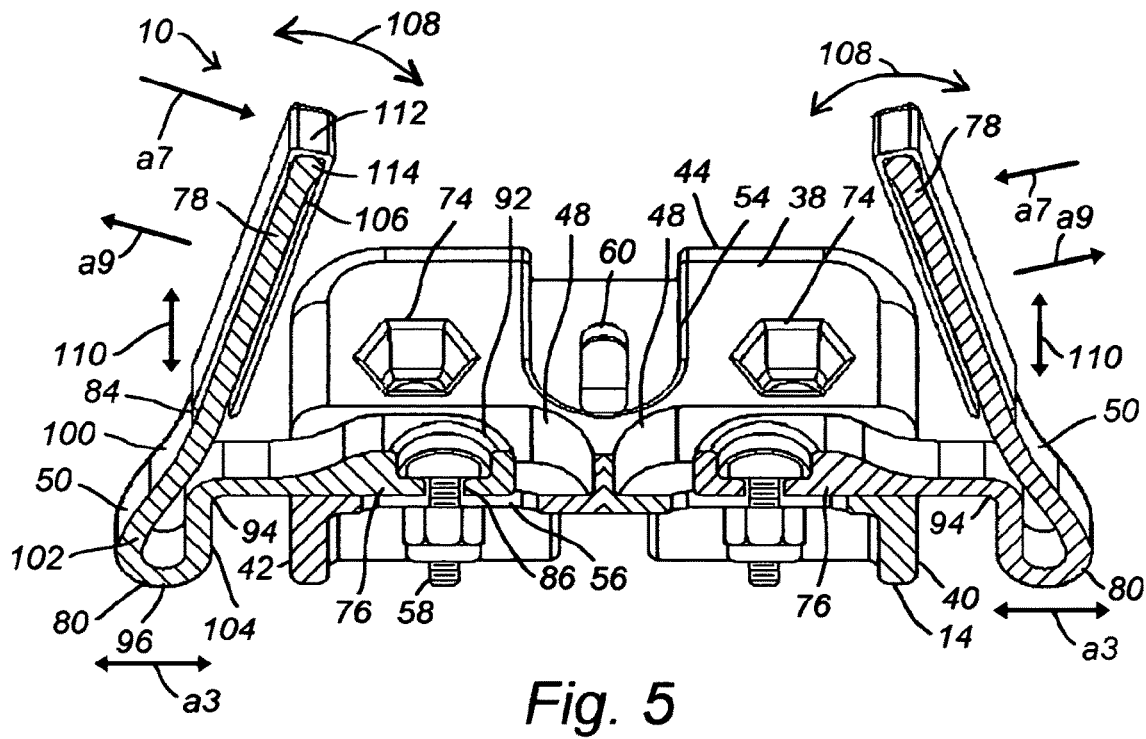
FIG. 5 is another cross-section view that illustrates the novel mounting apparatus.

FIG. 5 is another view that illustrates the novel mounting apparatus 10 having the portable device P removed for clarity. Here, the optional keyways 48 are illustrated as recessed into the mounting surface 38 of the frame 14 and intersecting the opposite edge surfaces 40 and 42 of the mounting surface 38. The resilient clamps 50 are thus movable in the keyways 48.

Figure 6:
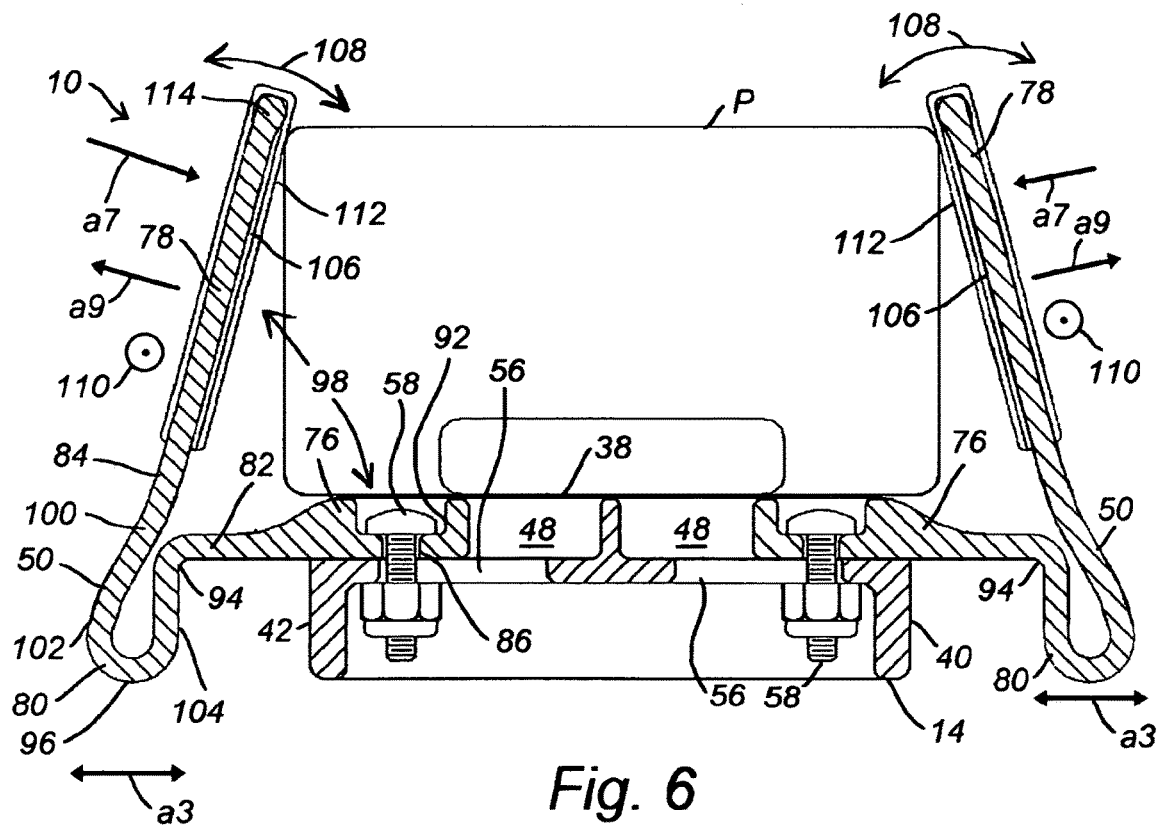
Figure 7:
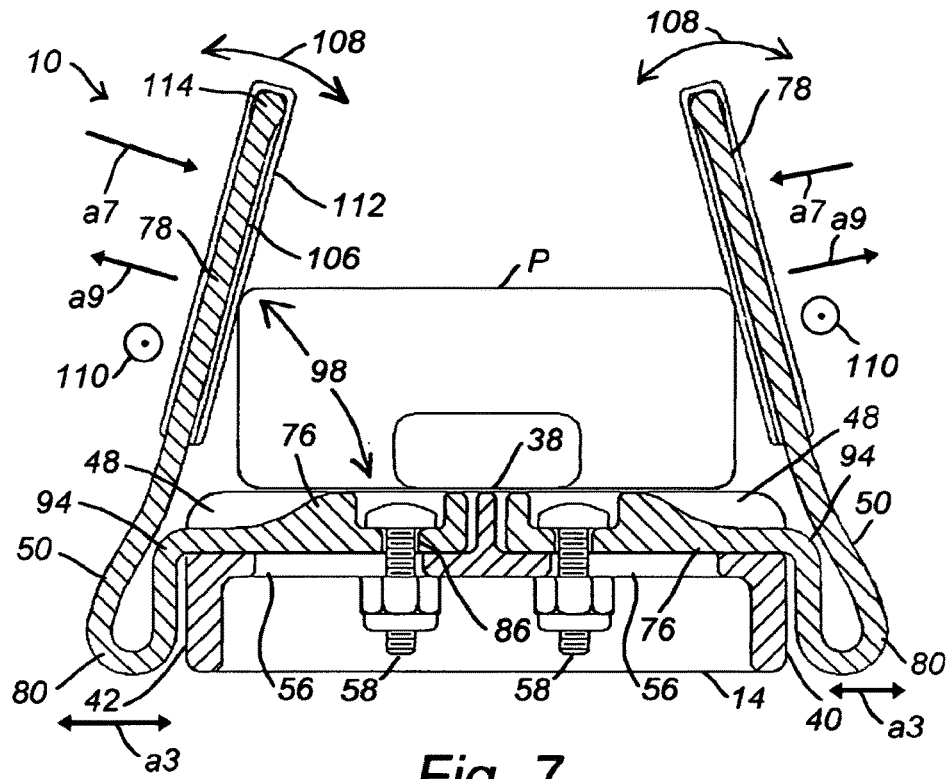

FIGS. 6 and 7 illustrate the novel mounting apparatus 10 having the portable device P inserted therein. FIG. 6 illustrates the mounting apparatus 10 having the resilient clamps 50 spread wide for holding a large sized device P. By example and without limitation, the leg portions 76 of the resilient clamps 50 are moved in the keyways 48 outward toward the opposite edge surfaces 40 and 42 of the mounting surface 38 for maximizing the space there between.

FIG. 7 illustrates the mounting apparatus 10 having the resilient clamps 50 moved close for holding a small sized device P. By example and without limitation, the leg portions 76 of the resilient clamps 50 are moved in the keyways 48 inward away from the opposite edge surfaces 40 and 42 of the mounting surface 38 for minimizing the space there between.

Figure 8:
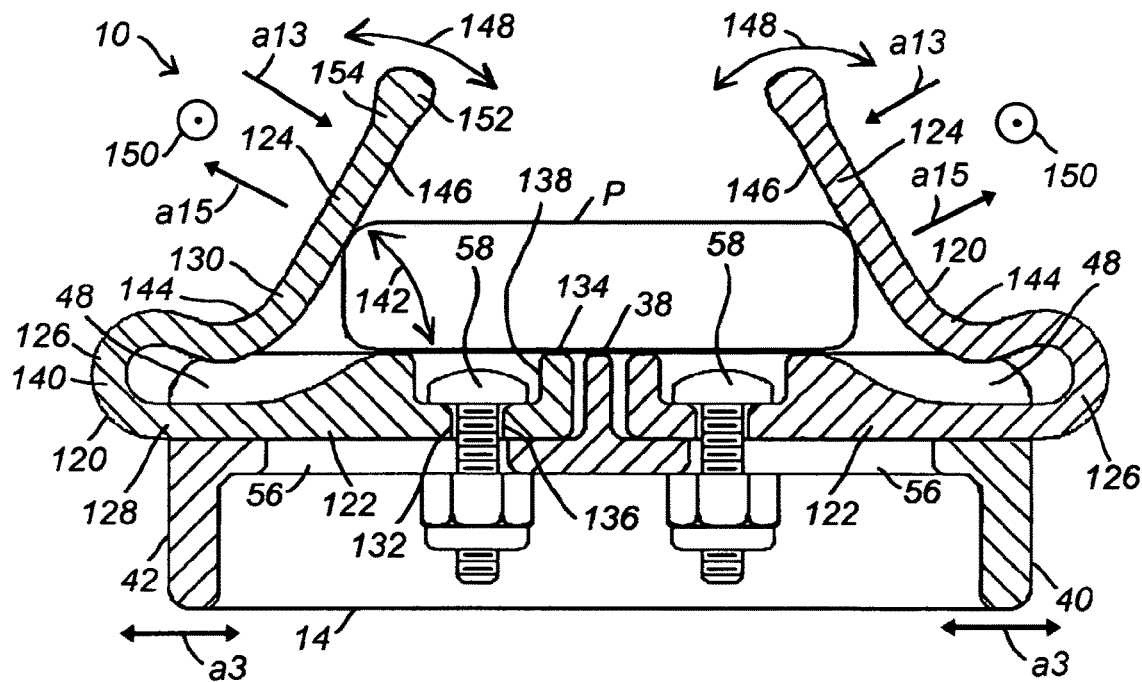

FIG. 8 illustrates the novel mounting apparatus 10 having an alternative pair of resilient clamps 120 that are movable in the keyways 48 for adjusting the distance there between. The alternative resilient clamps 120 are illustrated here by example and without limitation as being substantially flexible finger clamps each being formed with a substantially rigid leg portion 122 and a substantially "spatulate" finger portion 124 extended therefrom and substantially aligned therewith in a open V-shape with the finger portion 124 slightly inclined from an upright orientation toward the leg portion 122. A resilient urging portion 126 is coupled between adjacent inner end portions 128 and 130 of the leg portion 122 and finger portion 124, respectively.

The leg portion 122 is sized to slide in the optional lengthwise keyways 48, when present, and recessed into the mounting surface 38 of the frame 14. Furthermore, the leg portion 122 of each resilient clamp 120 is structured to be secured in the optional lengthwise keyways 48, when present, in a fixed position relative to the mounting surface 38 of the frame 14. For example, the leg portion 122 is formed there through with a passage 132 adjacent to a outer end 134 thereof for passing the fastener 58 through into the slot 56. As illustrated here by example and without limitation, each passage 132 includes a clearance hole 136 sized to admit the fastener 58 there through, and a recess 138, such as a countersink or counter bore (shown) sized to recess the fastener 58 into the clamp's leg portion 122.

Each alternative resilient clamp 120 is further formed with the substantially "spatulate" finger portion 124 extended from the leg portion 122 and substantially aligned therewith. By example and without limitation, the resilient urging portion 126 is coupled between the inner end portion 128 of the leg portion 122 and the inner end portion 130 of the finger portion 124, and urges the finger portion 124 generally toward the respective leg portion 122 as indicated by arrows a13.

Accordingly, when inserted between the opposing finger portions 124 of the alternative resilient clamps 120 on opposite sides 40 and 42 of the frame 14, the cellular phone or other portable device P is resiliently urged toward the opposing finger portions 124 and against the mounting surface 38 by the respective resilient urging portions 126 of opposing alternative clamps 120. After the spatulate finger portions 124 have been bent away from one another and from the frame's mounting surface 38 for inserting the device P there between, the respective resilient urging portions 126 cause the respective spatulate finger portions 124 to substantially automatically tend to resiliently return to its original configuration. This substantially automatic tendency of the respective finger portions 124 to each resiliently return to its original configuration effectively urges the device P simultaneously inwardly toward spatulate finger portions 124 of opposing alternative resilient clamps 120 and downwardly toward the mounting surface 38 of the frame 14, as indicated by arrows a13.

As illustrated here by example and without limitation, the resilient urging portion 126 of the resilient clamp 120 is embodied as a substantially flexible curved elbow portion 140. For example, the curved elbow portion 140 of the resilient urging portion 126 causes the leg portion 122 and finger portion 124 to form a smaller V-shaped volume 142 there between. The resilient clamp 120 includes a curved wrist portion 144 positioned between the inner end 130 of finger portion 124 and extended outwardly away from the smaller volume 142 enclosed by the V-shape of the leg portion 122 and finger portion 124.

The substantially flexible curved elbow portion 140 of the resilient urging portion 126 is, for example, positioned outside the smaller volume 142 enclosed by the V-shape of the leg 122 and finger 124 and coupled between the leg portion 122 and the outwardly curved wrist portion 144 of the finger portion 124.

As illustrated here by example and without limitation, the elbow portion 140 is formed with sufficient curvature to direct an inclined operational clamping surface 146 of the spatulate finger portion 124 facing the leg portion 122 are generally inclined toward the respective leg portion 122 as indicated by arrows a13. Accordingly, when the alternative resilient clamps 120 are installed on the frame 14 with their respective leg portions 122 fitted into the different keyways 48, the clamping surface 146 of each respective spatulate finger portion 124 is directed generally toward the frame 14, as indicated by arrows a13, such that the clamping surfaces 146 are generally inclined toward the mounting surface 38.

The elbow portion 140 and the two relatively long arm sections a53 and a77 of the resilient urging portion 126 are substantially resiliently flexible or "springy" in a first direction 148 substantially aligned with the leg portion 122, while being substantially rigid or stiff in a second direction 150 substantially crosswise of the leg portion 122. The elbow portion 140 cooperates with the curved wrist portion 144 in a resilient bending motion, as indicated by arrow a15, substantially opposite the first direction 148. Accordingly, opposing finger portions 124 of the alternative resilient clamps 50 on opposite sides 40 and 42 of the frame 14 are resiliently bendable away from one another and from the frame's mounting surface 38 for inserting the cellular phone (shown) or other portable device P between the opposing finger portions 124 of the resilient clamps 120 and against the mounting surface 38. The resiliently bendable feature of the elbow portion 140 of the resilient urging portion 80 and the wrist portion 144 cause each of the spatulate finger portions 124, after being bent away from one another and from the frame's mounting surface 38, to substantially automatically tend to return to its original configuration with its operational clamping surface 146 generally inclined toward the frame 14 and the mounting surface 38, as indicated by arrows a13.

The operational clamping surfaces 146 are optionally equipped with a relatively high coefficient of friction that operates in combination with the pressure applied by the inclined clamping surfaces 146 of the clamp members 120 to limit slippage of the device P relative to the frame's mounting surface 38. For example, the relatively high coefficient of friction is provided by the sleeve 112 fitted over the spatulate finger portions 124 of one or more of the alternative resilient clamps 120. By example and without limitation, the spatulate finger portions 124 are optionally formed with a bulb 152 adjacent to an outer tip 154 thereof that is slightly over-sized relative to the sleeve 112. The bulb 152 thus spreads the sleeve 112, which operates to hold it in place on the finger portion 124.

As illustrated here, the mounting apparatus 10 having the alternative resilient clamps 50 moved close for holding a small sized device P. By example and without limitation, the leg portions 122 of the alternative resilient clamps 120 are moved in the keyways 48 inward away from the opposite edge surfaces 40 and 42 of the mounting surface 38 for minimizing the space there between. Elimination of the curved knee portion 94 positioned adjacent to the inner end portion 82 of the leg portion 76 permits the finger portions 124 of the alternative resilient clamp 120 to be moved more nearly to the center of the frame's mounting surface 38 than the clamp 50 for minimizing the space between opposing finger portions 124.

Figure 9:
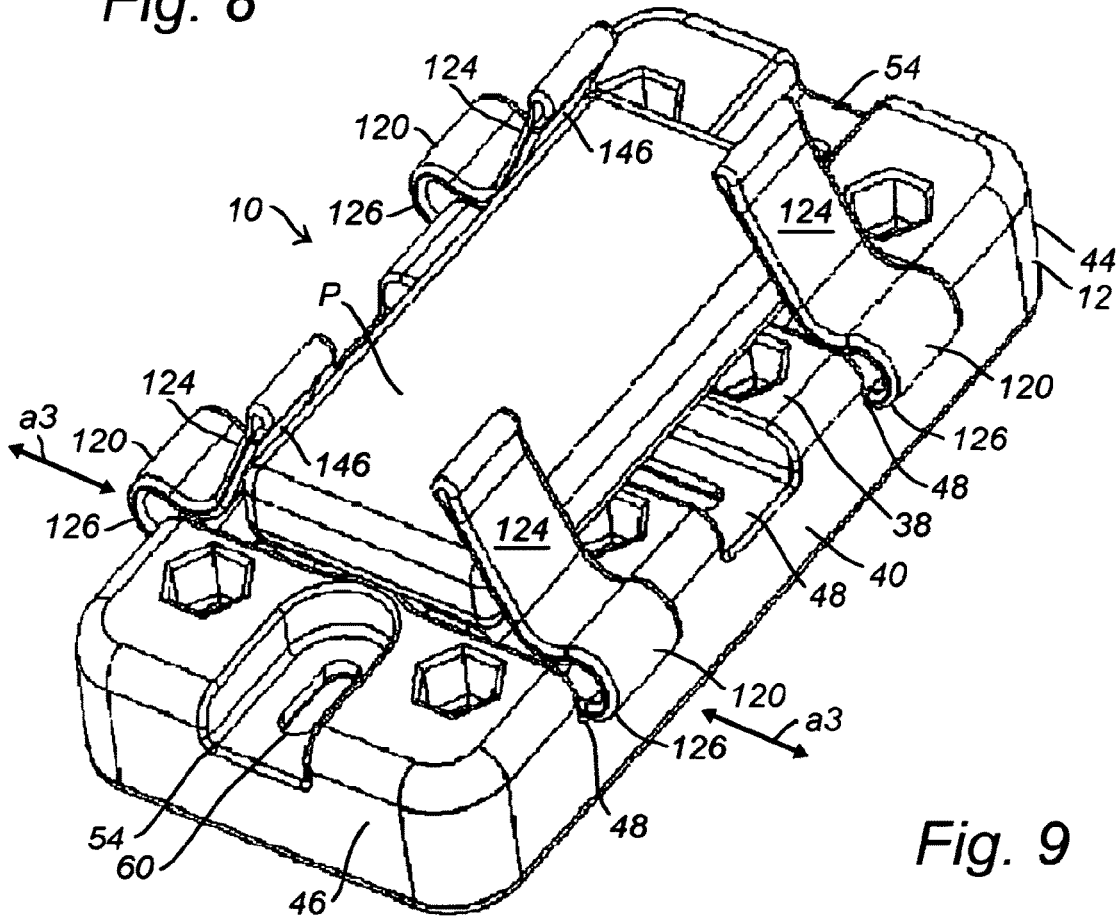
FIG. 9 illustrates the novel mounting apparatus having the alternative resilient clamps holding a small sized portable device.

FIG. 9 illustrates the mounting apparatus 10 having the alternative resilient clamps 120 moved close for holding a small sized device P. By example and without limitation, the leg portions 122 of the alternative resilient clamps 120 are moved in the keyways 48 inward away from the opposite edge surfaces 40 and 42 of the mounting surface 38 for minimizing the space there between. The opposing movable end stops 52 are removed for clarity.

Figure 10:
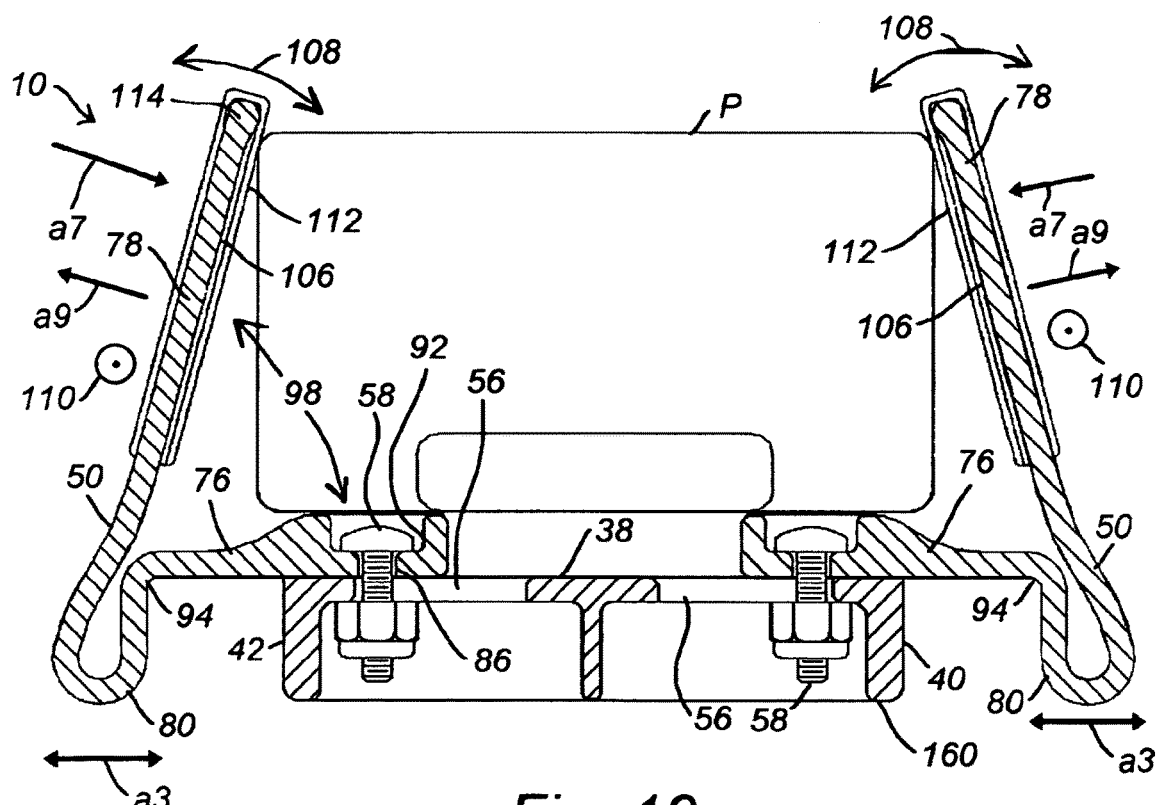
Figure 11:
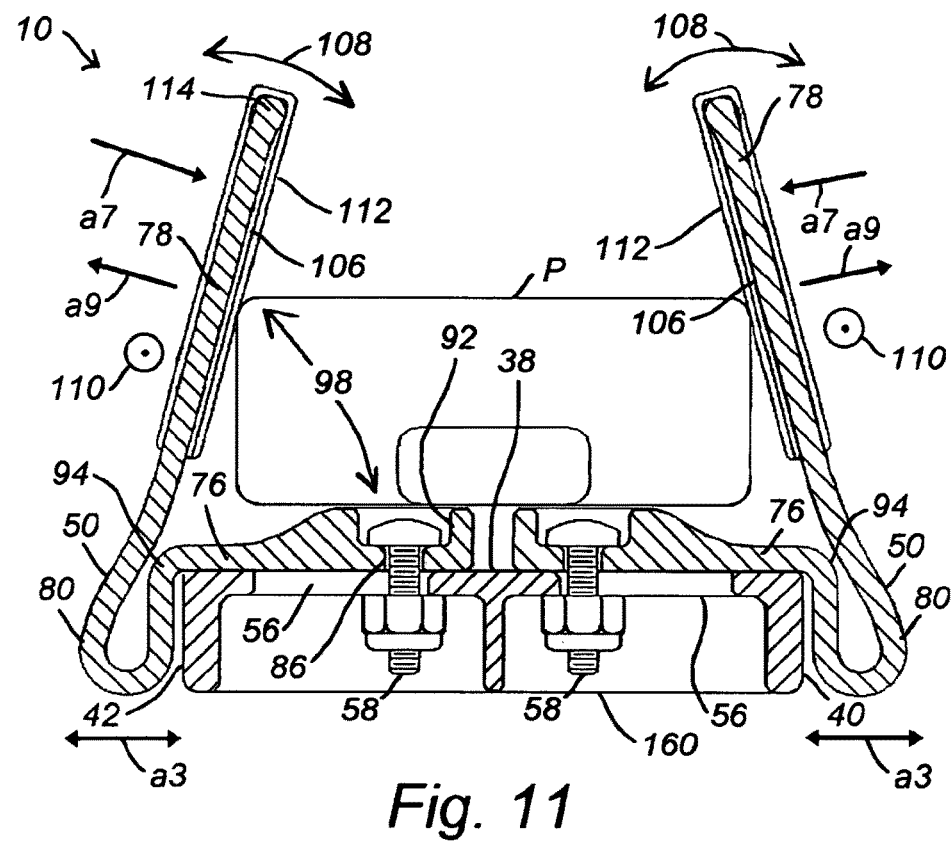

FIGS. 10 and 11 illustrate the mounting apparatus 10 having an alternative frame 160 in which the optional keyways 48 and keyways 54 are eliminated. Here, the slots 56 and 27 for fasteners 58 and 62, respectively, are formed instead through the mounting surface 38. The resilient clamps 50 (or alternative resilient clamps 120) are mounted directly on the frame's mounting surface 38 and are movable thereon for maximizing or minimizing the space between the opposing finger portions 78 (or 124). The portable device P is spaced above the mounting surface 38 and instead rests directly on the leg portions 76 (or 122) resilient clamps 50 (or alternative resilient clamps 120).

While one embodiment has been illustrated and described, it will be appreciated that various changes can be made therein without departing from the spirit and scope of the suction cup holding device.

The invention claimed is:

1. A flexible portable device mount apparatus, the apparatus comprising:
    a frame structured for being coupled to an external mounting device, the frame comprising:
        a mounting surface comprising at least one set of first and second passages;
        a plurality of substantially resiliently flexible clamps, each comprising a leg portion, a substantially resiliently flexible, U-shaped urging portion, and a finger portion,
            wherein said urging portion is positioned between said leg portion and said finger portion,
            wherein said leg portion defines a first plane and said finger portion defines a second plane,
            wherein said finger portion is inclined toward said first plane such that said first and second planes define an interior angle and a reflex angle, and
            wherein said U-shaped urging portion is positioned in said reflex angle; and
    a fastener for coupling each said leg portion relative to the mounting surface through one of said first and second passages.

2. The apparatus of claim 1 wherein said interior angle is acute.

3. The apparatus of claim 1 wherein said U-shaped urging portion opens toward said finger portion.

4. The apparatus of claim 3 wherein said U-shaped urging portion is substantially positioned on the side of said first plane that is opposite of said finger portion.

5. The apparatus of claim 1 wherein said U-shaped urging portion opens toward said leg portion.

6. The apparatus of claim 5 wherein said U-shaped urging portion is substantially positioned on the side of said second plane that is opposite of said leg portion.

7. The apparatus of claim 1 wherein said U-shaped urging portion comprises two long arm sections connected through an elbow portion.

8. The apparatus of claim 7 wherein said two long arm sections are substantially parallel.

9. The apparatus of claim 7 wherein said finger portion is substantially linear.

10. The apparatus of claim 7 wherein said leg portion is substantially linear.

11. The apparatus of claim 7 wherein both said finger portion and said leg portion are substantially linear.

12. The apparatus of claim 7 further comprising a plurality of first and second passages.

13. The apparatus of claim 1 wherein one or more of the first and second passages further comprises a slot formed through the frame substantially crosswise of the mounting surface.

14. The apparatus of claim 13 wherein one or more of the first and second passages further comprises a keyway recessed into the mounting surface around the slot and sized to slidingly receive therein the leg portion of one of the clamps.

15. The apparatus of claim 14, further comprising at least one end stop, wherein said end stop comprises a leg portion and a foot portion; and a fastener for coupling the leg portion of said end stop relative to the mounting surface through a passage on said mounting surface.

16. The apparatus of claim 15 wherein said passage for said end stop further comprises a slot formed through the frame substantially lengthwise of the mounting surface, and a keyway recessed into the mounting surface around the slot and sized to slidingly receive therein the leg portion of said end stop.

17. The apparatus of claim 16 further comprising a plurality of end stops, wherein each said end stop comprises a leg portion and a foot portion; and a plurality fasteners for coupling the leg portion of each said end stop relative to the mounting surface through passages on the mounting surface for said end stops.

18. A flexible portable device mount apparatus, the apparatus comprising:
 a frame structured for being coupled to an external mounting device, the frame comprising:
  a mounting surface; and
  a plurality of substantially resiliently flexible clamps, each comprising a leg portion, a substantially resiliently flexible, U-shaped urging portion, and a finger portion,
   wherein said urging portion is positioned between said leg portion and said finger portion,
   wherein said leg portion defines a first plane and said finger portion defines a second plane,
   wherein said finger portion is inclined toward said first plane such that said first and second planes define an interior angle and a reflex angle, and
   wherein said U-shaped urging portion is positioned in said reflex angle.

19. The apparatus of claim 18 wherein said interior angle is acute.

20. The apparatus of claim 18 wherein said U-shaped urging portion opens toward said finger portion.

21. The apparatus of claim 20 wherein said U-shaped urging portion is substantially positioned on the side of said first plane that is opposite of said finger portion.

22. The apparatus of claim 18 wherein said U-shaped urging portion opens toward said leg portion.

23. The apparatus of claim 22 wherein said U-shaped urging portion is substantially positioned on the side of said second plane that is opposite of said leg portion.

24. The apparatus of claim 18 wherein said U-shaped urging portion comprises two long arm sections connected through an elbow portion.

25. The apparatus of claim 24 wherein said two long arm sections are substantially parallel.

26. The apparatus of claim 24 wherein said finger portion is substantially linear.

27. The apparatus of claim 24 wherein said leg portion is substantially linear.

28. The apparatus of claim 24 wherein both said finger portion and said leg portion are substantially linear.

29. The apparatus of claim 24 wherein said mounting surface comprises at least one passage and at least one fastener for coupling the leg portion of a clamp relative to the mounting surface through said passage.

30. The apparatus of claim 29 wherein said passage further comprises a slot formed through the frame substantially crosswise of the mounting surface.

31. The apparatus of claim 30 wherein said passage further comprises a keyway recessed into the mounting surface around the slot and sized to slidingly receive therein the leg portion of one of the clamps.

32. The apparatus of claim 24 wherein said mounting surface comprises a plurality of passages, and a plurality of fasteners, each fastener for coupling a leg portion of one of the clamps relative to the mounting surface through one of said passages.

33. The apparatus of claim 32 wherein each said passage further comprises a slot formed through the frame substantially crosswise of the mounting surface.

34. The apparatus of claim 33 wherein each said passage further comprises a keyway recessed into the mounting surface around the slot and sized to slidingly receive therein the leg portion of one of the clamps.

35. The apparatus of claim 24, further comprising at least one end stop, wherein said end stop comprises a leg portion and a foot portion; and a fastener for coupling the leg portion of said end stop relative to the mounting surface through a passage on said mounting surface.

36. The apparatus of claim 35 wherein said passage for said end stop further comprises a slot formed through the frame substantially lengthwise of the mounting surface, and a keyway recessed into the mounting surface around the slot and sized to slidingly receive therein the leg portion of said end stop.

* * * * *